United States Patent
Xuan et al.

(10) Patent No.: US 6,787,732 B1
(45) Date of Patent: Sep. 7, 2004

(54) METHOD FOR LASER-SCRIBING BRITTLE SUBSTRATES AND APPARATUS THEREFOR

(75) Inventors: Jialuo Jack Xuan, Hayward, CA (US); Chung-Yuang Shih, Cupertino, CA (US); Thanh Duc Nguyen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/228,066

(22) Filed: Aug. 27, 2002

Related U.S. Application Data (60) Provisional application No. 60/369,694, filed on Apr. 2, 2002.

(51) Int. Cl.[7] .......................... B23K 26/36; B23K 26/38
(52) U.S. Cl. .............................. 219/121.67; 219/121.69
(58) Field of Search ........................ 219/121.67, 121.68, 219/121.69, 121.72, 121.73, 121.75, 121.78, 121.81, 121.82

(56) References Cited

U.S. PATENT DOCUMENTS

| | | | |
|---|---|---|---|
| 3,626,141 A | | 12/1971 | Daly |
| 3,866,398 A | | 2/1975 | Vernon, Jr. et al. |
| 4,865,686 A | | 9/1989 | Sinohara |
| 5,609,284 A | | 3/1997 | Kondratenko |
| 5,776,220 A | | 7/1998 | Allaire et al. |
| 5,801,356 A | | 9/1998 | Richman |
| 5,876,550 A | * | 3/1999 | Feygin et al. ................ 156/264 |
| 5,883,356 A | * | 3/1999 | Bauer et al. ........... 219/121.62 |
| 5,942,137 A | | 8/1999 | Kamir et al. |
| 5,961,852 A | | 10/1999 | Rafla-Yuan et al. |
| 6,211,488 B1 | | 4/2001 | Hoekstra et al. |
| 6,259,058 B1 | | 7/2001 | Hoekstra |
| 6,563,998 B1 | * | 5/2003 | Farah et al. ................ 385/131 |

* cited by examiner

Primary Examiner—Samuel M. Heinrich
(74) Attorney, Agent, or Firm—McDermott Will & Emery LLP (57) ABSTRACT

A method of separating a sheet of a brittle material into portions by means of laser-scribing, comprising steps of:

(a) providing a sheet of a brittle material having first and second opposing major surfaces separated by a thicknesst;

(b) providing a source of laser energy adjacent said first surface, adapted for supplying a focussed beam of laser energy converging to a focal spot in a plane parallel to the first surface;

(c) irradiating the sheet of brittle material with the focussed beam of laser energy, the plane of the focal spot of the beam initially being positioned within the sheet just below the first surface; and (d) continuing irradiating while simultaneously providing relative movement between the focal spot of the laser beam and the sheet to move the focal spot at a pre-selected rate and path extending over the first surface, and moving the depth of the plane of the focal spot at a pre-selected rate through a major portion of thickness t of the sheet to form a micro-crack zone extending along the pre-selected path from just below the first surface to a shallow depth just below the second surface.

20 Claims, 4 Drawing Sheets

METHOD FOR LASER-SCRIBING BRITTLE SUBSTRATES AND APPARATUS THEREFOR

CROSS-REFERENCE TO PROVISIONAL APPLICATION

This application claims priority from U.S. provisional patent application Serial No. 60/369,694 filed Apr. 2, 2002, the entire disclosure of which is incorporated herein by reference.

FIELD OF THE INVENTION

The present invention relates to a method for cutting or shaping sheets of brittle materials into desired configurations or geometries utilizing a laser-scribing technique. The present invention has particular applicability in laser-scribing brittle non-magnetic sheets along curvilinear paths to produce substrates for use in the manufacture of magnetic recording media.

BACKGROUND OF THE INVENTION

Two techniques are conventionally employed for cutting or shaping a sheet of brittle material, such as a glass, amorphous glass, glass-ceramic or ceramic material, to form a sheet or substrate with a desired configuration or geometry. A first such conventional method involves mechanical scribing of the sheet employing a hard device, such as a diamond tip, to score the surface of the brittle material, which is then broken along the score line or pattern. The second of such conventional techniques involves laser-scribing. Currently employed laser-scribing differs from traditional high power (i.e., >1 KW) laser-drilling/cutting and utilizes a lower power (i.e., <500 W) for achieving scribing with less material removal and better edge quality subsequent to breaking/separation. Such laser-scribing typically utilizes a continuous wave ("CW") laser, such as a $CO_2$ laser, to heat a localized zone of a brittle material, such as an amorphous-glass sheet (similar to float glass), up to a temperature below the softening point of the material, and then immediately quenching the heated zone by applying a coolant, e.g., a gas such as air or a liquid such as water.

In a typical process for laser-scribing an amorphous glass sheet, the output beam of a CW $CO_2$ laser, or a high frequency pulse repetition rate $CO_2$ laser, is re-shaped into a beam with an elongated spot shape, which beam is utilized in an unfocussed manner for locally heating the glass. The locally heated zone is then chilled by spraying cool air or an air/liquid (e.g., air/water) mixture. When the localized heating/cooling process starts from a small surface defect or micro-crack made in the glass, e.g., by a means of a mechanical scriber or indenter, or by application of suitable laser pulses, the defect or micro-crack propagates to form a scribing line due to the combination of localized heating-quenching which initiates tiny surface cracks arising from compression-tension stress effects. The sheet of material is then separated, i.e., broken, along the scribing line by applying an external thermal or mechanical stress.

A conventional laser-scribing technique utilizing a low power $CO_2$ laser is disclosed by Kondratenko in U.S. Pat. No. 5,609,284, wherein an elliptical target area is impinged with a beam of coherent radiation along the intended direction of the crack, while a stream of fluid coolant is directed at a point on the heated surface on the intended line of the crack. U.S. Pat. No. 6,259,058 B1 to Hoekstra discloses a modification of U. S. Pat. No. 5,609,284 wherein dual laser beams are utilized after cooling in order to assist separation along the laser-scribing line. Allaire et al. in U.S. Pat. No. 5,776,220 disclose a laser-scribing technique for brittle materials wherein the laser spot has an extremely elongated elliptical shape such that its major axis is greater than 20 mm to enable rapid scribing.

Conventional substrates for use in manufacturing magnetic recording media include various brittle materials, such as glasses, ceramics and glass-ceramics. In order to form annular disk-shaped substrates suitable for use in magnetic and/or magneto-optical (MO) recording media, two circular scribings must be performed with high precision, one defining the outer diameter (e.g., ranging from about 65 to about 95 mm, such as 84 mm) and one defining the inner diameter (e.g., ranging from about 20 to about 25 mm). However, applicability of current linear laser-scribing techniques, such as utilized with flat panels, to circular scribing for producing annularly-shaped substrates suitable for manufacture of disk-shaped magnetic and/or magneto-optical recording media, is limited, for at least the following reason: laser-scribing is very sensitive to variations of the glass material, including optical reflectivity of the surface, glass composition, surface and thickness uniformity, etc., resulting in that the $CO_2$ laser-based scribing process requires very precise control of defect initialization, laser power distribution, and cooling stream. As a consequence, current laser-scribing technology of amorphous glass substrates is generally restricted to linear scribing.

Another drawback/disadvantage of conventional laser-scribing technology is associated with the methodology for separating/breaking the brittle substrate (e.g., of amorphous glass) subsequent to laser-scribing. Specifically, because of the nature of the localized heating/cooling of the laser-scribing process, and due to the formation of a compression layer on the surface of the amorphous glass sheet, the propagation of micro-cracks during the laser-scribing process occurs in the layer nearest the glass surface. As a consequence, the scribe line provided by a single laser beam at the surface of a glass surface is insufficiently deep, and application of additional mechanical force to the glass sheet is typically required during the laser-scribing process or subsequent thereto, disadvantageously resulting in edge defects, residual stresses, increased risk of cracking resulting in product loss (i.e., low yield), reduced product throughput, and poor cost-effectiveness arising from a requirement for complicated, thus expensive, processing.

In view of the above-described disadvantages, drawbacks, and difficulties associated with utilization of laser-scribing technology for forming curvilinear-shaped brittle sheets, conventional practices for cutting/shaping brittle glass substrates for use in magnetic recording media involve the use of diamond tips to induce mechanical stresses. However, the required high tolerances are not fully satisfied by mechanical scribing. Moreover, it is necessary to perform extensive polishing and lapping after the mechanical scribing, thereby significantly increasing manufacturing costs.

Thus, there exists a need for a method and apparatus for laser-scribing a brittle substrate along a curvilinear path, particularly a substantially circular path. There exists a particular need for an apparatus and methodology for laser-scribing brittle materials, such as glasses, ceramics and glass-ceramics, along substantially circular paths to form annular disk-shaped substrates for use in manufacturing magnetic and MO recording media.

The present invention, therefore, addresses and solves the above-described drawbacks, disadvantages, difficulties, and shortcomings of the conventional methodologies and instrumentalities for performing laser-scribing of brittle glass substrates, particularly when utilized for performing curvilinear laser-scribing of amorphous glass substrates suitable for use in the manufacture of disk-shaped magnetic and MO media. According to the invention, a UV-based laser-scribing process and apparatus is provided which is especially well-adapted for shaping glass sheets into annular-shaped disks with inner and outer diameters, which methodology and apparatus provide a simple, readily controllable manufacturing process with increased product throughput and cost-effectiveness.

DISCLOSURE OF THE INVENTION

An advantage of the present invention is an improved method of shaping a sheet of brittle material.

Another advantage of the present invention is an improved method of separating a sheet of a brittle material into portions by means of laser-scribing.

Yet another advantage of the present invention is an improved method of shaping a sheet of brittle material along concentric inner and outer circular paths to form an annular disk.

A further advantage of the present invention is an improved apparatus for shaping a sheet of brittle material.

A still further advantage of the present invention is an improved apparatus for separating a sheet of a brittle material into portions by means of laser-scribing.

A yet further advantage of the present invention is an improved apparatus for shaping a sheet of brittle material along concentric inner and outer circular paths to form an annular disk.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in pair by a method of separating a sheet of a brittle material into portions by means of laser-scribing, comprising steps of:

(a) providing a sheet of a brittle material having first and second opposing major surfaces separated by a thickness t;

(b) providing a source of laser energy adjacent one of the first and second surfaces, the laser energy source adapted for supplying a focussed beam of laser energy converging to a focal spot in a plane parallel to the one surface;

(c) irradiating the sheet of brittle material with the focussed beam of laser energy from the source, the plane of the focal point of the laser beam initially being positioned within the sheet just below the first surface thereof; and (d) continuing said irradiating while simultaneously: (1) providing relative movement between the focal spot of the laser beam and the sheet to move the focal spot at a pre-selected rate along a pre-selected path extending over the first surface, and (2) moving the depth of the plane of the focal point at a pre-selected rate through a major portion of the thickness t of the sheet to form a micro-crack zone extending along the pre-selected path from just below the first surface to a shallow depth just below the second surface.

Embodiments of the present invention include the following further step of:

(e) separating the sheet along the pre-selected path.

According to embodiments of the present invention, step (a) comprises providing a sheet of a brittle material selected from the group consisting of glass, amorphous glass, ceramic, and glass-ceramic materials; step (b) comprises providing a pulsed UV laser source, e.g., a pulsed UV laser source having a pulse repetition rate from about 10 to about 100 KHz, a wavelength from about 196 to about 355 nm, and TEM $_{00}$ mode quality $M^2<1.5$; step (c) comprises positioning the plane of the focal spot of the laser beam at a minimum depth below the first surface which does not result in micro-crack zone formation at the first surface; step (d) comprises moving the focal spot of the laser beam along the pre-selected path while the sheet is maintained stationary, or step (d) comprises moving the sheet along the pre-elected path while the focal spot of the laser beam is maintained stationary; wherein: step (d) comprises providing relative movement between the laser beam and the sheet to move the focal spot of the laser beam along a pre-selected linear, curvilinear, or linear-curvilinear path, e.g., a circular path.

In accordance with embodiments of the present invention, step (d) comprises moving the depth of the plane of the focal spot of the laser beam by optical means, or by varying a distance between the source of laser energy and the first surface of the sheet.

According to preferred embodiments of the present invention, step (a) comprises providing a sheet of amorphous glass for use as a substrate for a hard disk magnetic or magneto-optical recording medium; step (b) comprises providing a pulsed UV laser source having a pulse repetition rate of about 20 KHz, a wavelength of about 355 nm, average power of about 3.5 W, and a focal spot diameter <5 μm; and step (d) comprises providing relative movement between the focal spot of the laser beam and the sheet along at least one circular path at a rate from about 40 to about 100 mm/sec. to form an about 20 μm wide micro-crack zone extending for a depth within the sheet of from about 100 to about 100 μm; wherein: step (d) comprises providing relative movement between the focal spot of the laser beam and the sheet along concentric inner and outer circular paths; and step (e) comprises separating the sheet along the concentric inner and outer paths to form an annularly-shaped disk.

Another aspect of the present invention is an apparatus for performing laser-scribing of a sheet of material, comprising:

(a) a mounting means for mounting a sheet of a material having first and second opposing major surfaces having a thickness t;

(b) a source of laser energy adapted for supplying a focussed beam of laser energy converging to a focal spot in a plane parallel to the first surface of the sheet of material;

(c) means for providing relative movement between the focal spot of the laser beam and the sheet for moving the beam at a pre-selected rate along a pre-selected path extending over the first surface of the sheet of material; and (d) means for moving the depth of the plane of the focal spot of the laser beam at a pre-selected rate through a major portion of the thickness of the sheet of material from a depth near the first surface to a depth nearer the second surface.

According to embodiments of the present invention, the source (b) of laser energy is pulsed UV laser source having a pulse repetition rate from about 10 to about 100 KHz, a wavelength from about 196 to about 355 nm, and TEM $_{00}$ mode quality $M^2<1.5$, and according to certain embodiments of the present invention, source (b) of laser energy is a pulsed UV laser source having a pulse repetition rate of about 20 KHz, a wavelength of about 355 nm, average power of about 3.5 W, and a focal spot diameter <5 μm; and means (c) for providing relative movement between the focal spot of the laser beam and the sheet is adapted to provide a moving speed from about 40 to about 100 mm/sec.

In accordance with alternative embodiments of the present invention, means (c) for providing relative movement between the focal spot of the laser beam and the sheet comprises means for moving the focal spot along a pre-selected linear or curvilinear path while maintaining the sheet stationary; or means (c) for providing relative movement between the focal spot of the laser beam and the sheet comprises means for moving the sheet along a pre-selected linear or curvilinear path while maintaining the focal spot of the laser beam stationary; and means (d) for moving the depth of the plane of the focal spot of the laser beam at the pre-selected rate comprises optical means or means for varying a distance between the source of laser energy (b) and the first surface of said sheet.

A further aspect of the present invention is an apparatus for performing laser-scribing of a sheet of material having first and second opposing major surfaces, comprising:

(a) a source of laser energy adapted for supplying a focussed beam of laser energy converging to a focal spot in a plane parallel to the first surface of the sheet of material; and (b) means for effecting relative movement between the focal spot of the beam of laser energy and the surface of the sheet along a pre-selected path at a pre-selected rate while simultaneously effecting movement of the depth of the plane of the focal spot of the laser beam at a pre-selected rate through a major portion of the thickness of the sheet of material from a depth near the first surface to a depth nearer the second surface.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon the discovery by the inventors that reliable and well-controlled linear and/or curvilinear scribing and separation of sheets of brittle, non-metallic materials, such as of glass, can be accomplished in cost-effective manner by means of a relatively uncomplicated system and methodology utilizing a single UV laser, in place of the conventional, more complicated and costly $CO_2$ laser-based scribing system/process requiring additional cooling/separation control.

According to the invention, a spot-focussed beam of pulsed, short-wavelength UV radiation is utilized to generate a zone of micro-cracks just beneath the surface of a sheet of brittle material, wherein the width, depth, and compressive stress of the micro-crack zone is adjusted via manipulation of the peak power of the laser pulse, pulse repetition rate, and speed of relative movement between the surface of the sheet and the beam. The invention thus provides a UV laser-based solution to the problem of performing accurate and cost-effective separation of sheets of glass and other brittle, non-metallic materials along curvilinear paths, particularly as required in the manufacture of annular disk-shaped substrates for magnetic and/or magneto-optical (MO) recording media requiring formation of a circularly-shaped outer periphery (i.e., outer diameter, OD) and a circularly-shaped inner hole (i.e., inner diameter, ID).

Figure 1:
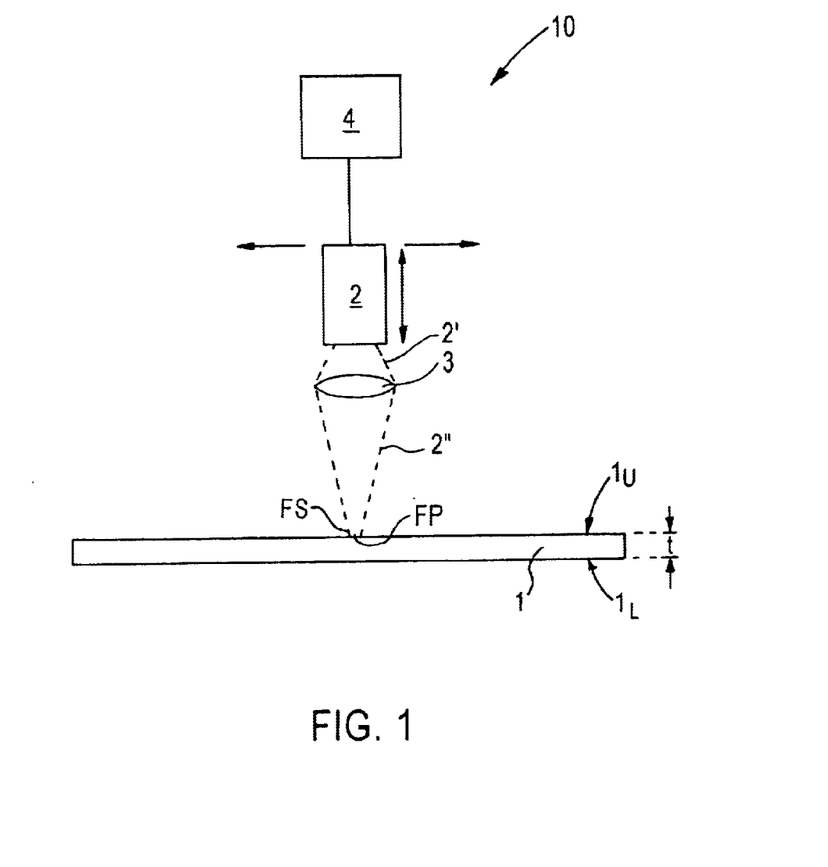
FIGS. 1–3 are simplified, schematic cross-sectional side views of illustrative embodiments of laser-scribing apparatus/systems according to the present invention.
Figure 2:
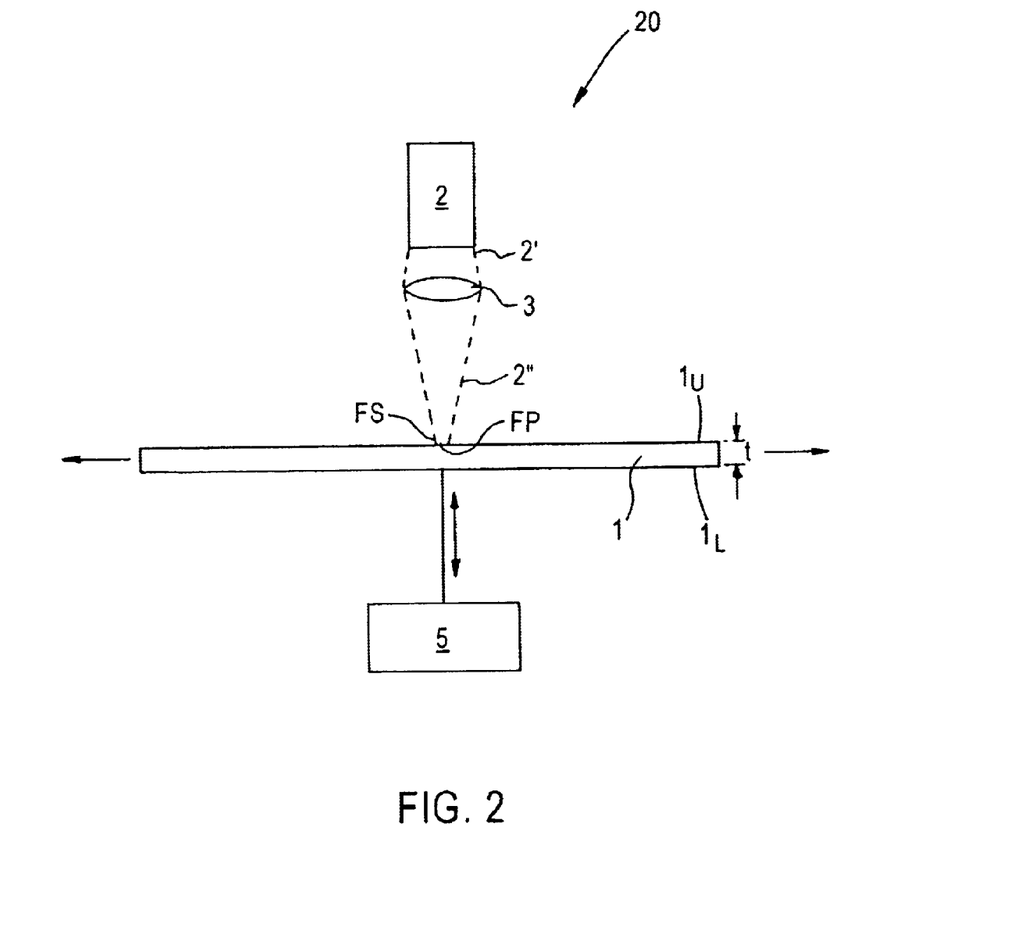
Figure 3:
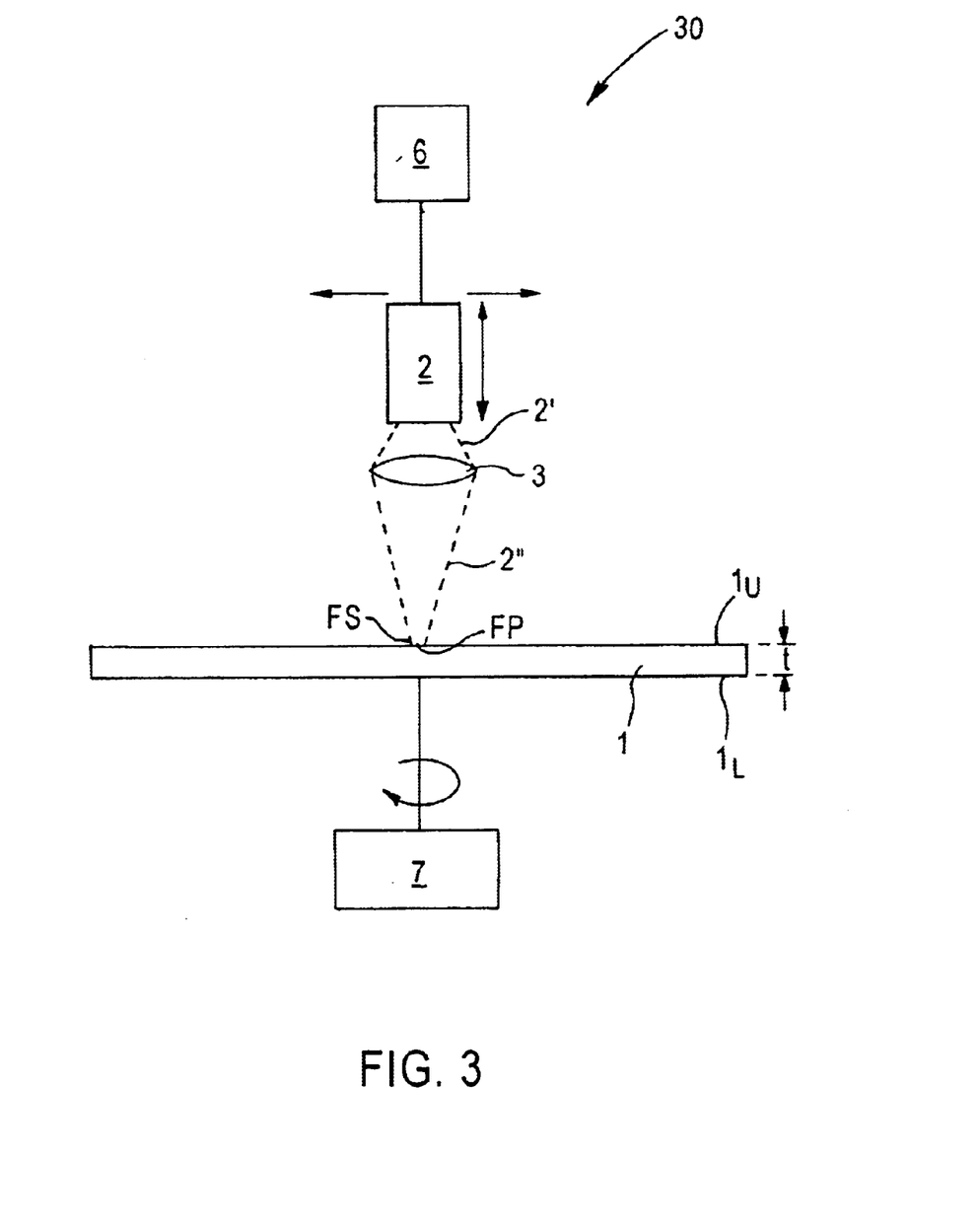

Referring to FIGS. 1–3, shown therein are simplified, schematic cross-sectional side views of several illustrative, but not limitative, embodiments of pulsed UV laser-based scribing apparatus/systems 10, 20, and 30 according to the present invention. According to the invention, each laser-based scribing apparatus or system 10, 20, and 30 includes a sheet-like substrate or workpiece 1 of thickness t and upper and lower major surfaces $1_U$ and $1_L$, respectively. A pulsed UV laser source 2 is mounted above upper major surface $1_U$ of sheet 1 for supplying an expanded laser beam 2' to lens 3 or equivalent focussing means, which lens or equivalent means, in turn, supplies a focussed beam of laser energy 2" converging to a focal spot FS in a focal plane FP parallel to the upper major surface $1_U$ of substrate 1. According to the invention, each laser-based scribing apparatus or system 10, 20, and 30 includes a means for effecting relative movement between the focal spot FS of the focussed beam of laser energy 2" and the upper surface $1_U$ of sheet 1 along a pre-selected path at a pre-selected rate while simultaneously effecting movement of the depth of the focal plane FP of the focal spot VS of the laser beam 2" at a pre-selected rate through a major portion of the thickness t of the sheet 1 from a depth near the upper surface $1_U$ to a depth nearer the lower surface $1_L$.

Adverting to FIG. 1, shown therein is an embodiment of a laser-scribing apparatus/system 10 wherein sheet 1 is maintained stationary during processing and bi-directional movement of the laser beam 2" (i.e., horizontal translational movement of the focal spot FS and vertical movement of the focal plane FP), as indicated in the figure by the respective horizontally and vertically oriented arrows, is provided by means 4 (of conventional design, not described herein in detail for brevity) operatively connected to laser source means 2. In a modification of apparatus/system 10, means 4 is adapted to provide only horizontal (translational) movement of focal spot FS of beam 2", and vertical movement of the focal plane FP of beam 2" is provided by appropriate adjustment, etc., of the focus of lens 3 or optically equivalent means.

Referring to FIG. 2, shown therein is an embodiment of a laser-scribing apparatus/system 20 wherein laser source means 2 and associated focussing lens 3 or optically equivalent means are maintained stationary during processing and bi-directional movement of substrate/workpiece 1 (as before, horizontal translational movement of the focal spot FS and vertical movement of the focal plane FP), again as indicated in the figure by the respective horizontally and vertically oriented arrows, is provided by substrate/workpiece moving table means 5 (of conventional design, not described herein in detail for brevity) operatively connected to substrate/workpiece 1. In a modification of apparatus/system 20, moving table means 5 is adapted to provide only horizontal (translational) movement of focal spot FS of beam 2", and vertical movement of the focal plane FP of beam 2" is provided by vertical movement of laser source 2, as by means 4 similar to that shown in FIG. 1 or by appropriate adjustment, etc., of the focus of lens 3 or optically equivalent means.

FIG. 3 illustrates yet another embodiment of a laser-scribing apparatus/system 30, especially useful in performing curvilinear scribing of concentric inner and outer circles, as in the fabrication of annular disk-shaped substrates for use in the manufacture of magnetic and/or magneto-optical recording media, wherein laser source means 2 is provided with means 6 (of conventional design, not described herein in detail for brevity) for effecting vertical movement of the focal plane FP of focussed laser beam 2" and linear translational (i.e., radial) movement of the focal spot FS of beam 2", and substrate/workpiece 1 is provided with means 7 (of conventional design, not described herein in detail for brevity) for effecting rotational translational movement of the focal spot FS of laser beam 2" (relative to the upper surface $1_U$ of substrate/workpiece 1), as indicated in the figure by the curved arrow. In a modification of apparatus/system 30, vertical movement of the focal plane FP of beam 2" is provided by appropriate adjustment, etc., of the focus of lens 3 or optically equivalent means.

Figure 4:
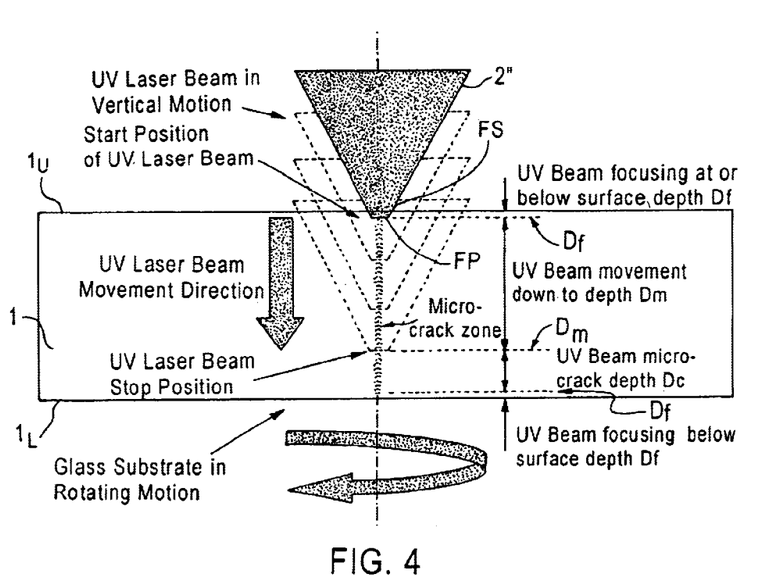
FIG. 4 is a simplified, schematic cross-sectional side view for illustrating operation of the apparatus/system of FIG. 3 when utilized for performing laser-scribing along a circularly-shaped path in a central region of a sheet, as in the manufacture of an annular disk-shaped substrate for a magnetic or magneto-optical (MO) recording medium.
Figure 5:
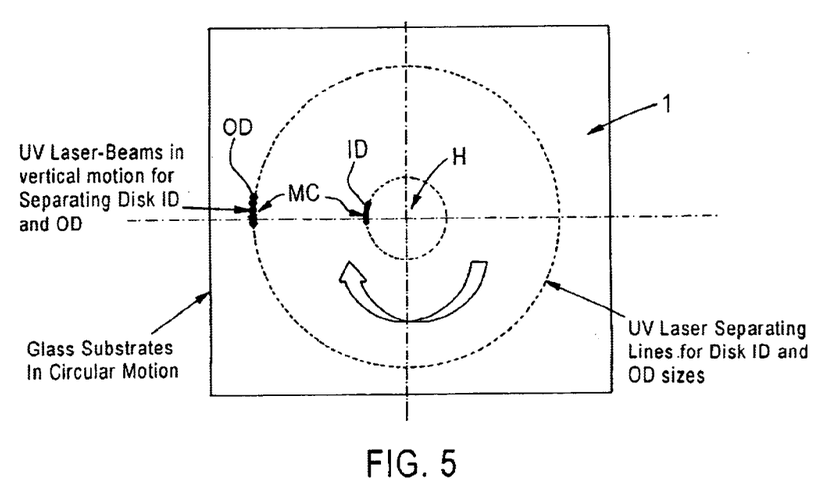
FIG. 5 is a simplified, schematic plan view for further illustrating the embodiment according to FIG. 4 wherein an annular-shaped disk is formed by laser-scribing.

FIGS. 4–5 are simplified, schematic cross-sectional side and plan views, respectively, for illustrating the method of operation of the apparatus/system of FIG. 3 according to an embodiment wherein laser-scribing is performed along a circularly-shaped path in a central region of a glass, amorphous glass, ceramic, or glass-ceramic sheet, as in the manufacture of an annular disk-shaped substrate for a magnetic or magneto-optical (MO) recording medium. According to this embodiment, focussed laser beam 2" is obtained from a suitable laser source 2, illustratively a modular, high pulse repetition rate, diode-pumped solid state laser, e.g., with a pulse repetition rate from about 10 to about 100 KHz, a wavelength from about 196 to about 355 nm, and TEM$_{00}$ mode quality $M^2 < 1.5$. The short wavelength UV laser beam from source 2 is initially expanded and then focussed, as by lens 3 or equivalent means, to a small focal spot FS, e.g., <5 μm diameter, at a focal plane FP of the pulsed laser beam 2" from source 2, which focal plane FP is first adjusted to lie at or near an initial depth $D_f$ just below the upper surface $1_U$ of substrate/workpiece 1. The latter is then rotated (at a constant rate or speed) about a central axis via rotation means 7, to form a first (or inner), narrow, continuous, circular scribe line ID (see FIG. 5) comprised of a plurality of substantially horizontally spaced-apart micro-cracks MC. Simultaneous with rotation of substrate/workpiece 1, the focal plane FP of the pulsed laser beam 2" is moved downwardly (at a constant rate or speed) by moving means 6 towards the lower surface $1_L$ of substrate/workpiece 1. As a consequence, the micro-crack zone and associated circular scribe line ID formation advances deeper and deeper into substrate/workpiece 1. When the focal plane FP of the pulsed laser beam 2" and the micro-crack zone and associated circular scribe line ID reaches a plane at a depth $D_m$ below the upper surface $1_U$, the laser-induced micro-crack zone will reach a plane at a short distance from the lower surface $1_L$, which distance is substantially equal to the initial depth $D_f$ of the micro-crack zone just below the upper surface $1_U$ of substrate/workpiece 1. According to the invention, for a sheet of thickness t, it is desirable that $D_f < 0.05$ t, and since $D_f$ and $D_c$ are known, $D_m$ is controlled such that $(2D_f + D_m + D_c) = t$ (ideal case) or $(2D_f + D_m + D_c) > t$ (separation).

Separation of substrate/workpiece 1 along the thus-produced circular scribe line ID without edge defect formation is facilitated by the presence of the micro-crack zone MC extending through the entire thickness t from just below the upper surface $1_U$ to just below the lower surface $1_L$. As indicated above, when $(2D_f + D_m + D_c) > t$ and $D_f < 0.05$ t, separation occurs automatically. When $(2D_f + D_m + D_c) = t$, minor connections are present between the portions to be separated, and a very slight mechanical force (without heating/cooling) is applied to achieve separation along the scribe line.

Following separation of substrate/workpiece 1 to form a central hole H therein of inner diameter equal to that of the previous circular scribe line ID, laser source means 2 is re-positioned, i.e., radially translated, via moving means 6, and the above-described laser-scribing process repeated to form a second (or outer), narrow, continuous, circular scribe line OD (see FIG. 5) comprised of a plurality of substantially horizontally spaced-apart micro-cracks MC. Separation of substrate/workpiece along scribe line OD results in formation of an annular disk-shaped substrate/workpiece suitable for use as a substrate in the manufacture of magnetic and/or MO recording media.

Formation of micro-crack (MC) zones which extend vertically through substantially the entire thickness t of substrate/workpiece 1 is obtained by appropriate selection/optimization of the laser parameters and rates of vertical and horizontal movement of the focal plane FP and focal spot FS, respectively, of laser beam 2". By way of illustration only, a 355 nm wavelength pulsed UV laser with an average power of about 3.5 W, 20 KHz pulse rate, horizontal movement speed between about 40 and about 100 mm/sec., and vertical movement speed, the latter being set at about 1 $D_c$/revolution, e.g., about 100–150 μm/revolution. Illustratively, for forming a circular scribe line of about 65 mm diameter, a vertical movement speed of about 0.02 to about 0.2 mm/sec. can be employed for forming a micro-crack zone of about 20 μm width and a depth of about 1 $D_c$ (i.e., from about 100 to about 150 μm) in an amorphous glass sheet.

A key factor in obtaining separation along the laser scribe line without incurring surface damage, e.g., edge defects, is control of the initial depth $D_f$ of the focal plane FP below the upper surface of the substrate/workpiece, which depth $D_f$ depends upon several factors, including, inter alia, laser wavelength, pulse energy, and properties of the substrate material. $D_f$ for each material can be determined by simple experimentation wherein the focal plane of the laser beam is first set at the upper surface of the substrate/workpiece, and if cracks are observed at the surface, increasing the depth of the focal plane below the surface until cracks are no longer observed at the surface and a micro-crack zone is formed within the interior of the substrate/workpiece. The width of the micro-crack line within the substrate/workpiece is narrower, smoother, and more controllable than the surface cracks, and separation is facilitated once a sufficiently deep micro-crack zone is formed. In addition, the inventive methodology is not limited to separating brittle substrates/workpieces along circular or other curvilinear-shaped laser-scribe lines, but is useful for separating a variety of brittle, non-metallic materials along linear laser-scribe lines.

The inventive methodology and apparatus and methodology enjoys particular utility in the manufacture of annular disk-shaped, thin-film magnetic and/or MO recording media utilizing various brittle, non-metallic substrates such as of glass, amorphous glass, ceramics, glass-ceramics, etc., wherein the manufacturing process involves shaping a sheet of substrate material into annular disks via a separating technique involving scribing of the substrate. The inventive methodology and apparatus advantageously eliminates problems associated with conventional shaping/scribing methodologies, including formation of defects along the separated edges. Finally, the inventive methodology and apparatus is fully compatible with all other aspects of automated manufacture of magnetic and/or MO media and is broadly applicable to the manufacture of a variety of different products requiring shaping of brittle substrate materials.

In the previous description, numerous specific details are set forth, such as specific materials, structures, processes, etc., in order to provide a better understanding of the present invention. However, the present invention can be practiced without resorting to the details specifically set forth. In other instances, well-known processing materials, structures, and techniques have not been described in detail in order not to unnecessarily obscure the present invention.

Only the preferred embodiments of the present invention and but a few examples of its versatility are shown and described in the present invention. It is to be understood that the present invention is capable of use in various other embodiments and is susceptible of changes and/or modifications within the scope of the inventive concept as expressed herein.

What is claimed is:

1. A method of separating a sheet of a brittle material into portions by means of laser-scribing, comprising steps of:
   (a) providing a sheet of a brittle material having first and second opposing major surfaces separated by a thickness t;
   (b) providing a source of laser energy adjacent one of said first and second surfaces, said laser energy source adapted for supplying a focussed beam of laser energy converging to a focal spot in a plane parallel to said one surface;
   (c) irradiating said sheet of brittle material with said focussed beam of laser energy from said source, said plane of said focal spot of said laser beam initially being positioned within said sheet just below said first surface thereof; and
   (d) continuing said irradiating while simultaneously: (1) providing relative movement between said focal spot of said laser beam and said sheet to move said focal spot at a pre-selected rate along a pre-selected path extending over said first surface, and (2) moving the depth of said plane of said focal spot at a pre-selected rate through a major portion of said thickness t of said sheet to form a micro-crack zone extending along said pre-selected path from just below said first surface to a shallow depth just below said second surface.

2. The method according to claim 1, further comprising the step of:
   (e) separating said sheet along said pre-selected path.

3. The method according to claim 1, wherein:
   step (a) comprises providing a sheet of a brittle material selected from the group consisting of glass, amorphous glass, ceramic, and glass-ceramic materials.

4. The method according to claim 1, wherein:
   step (b) comprises providing a pulsed UV laser source.

5. The method according to claim 4, wherein:
   step (b) comprises providing a pulsed UV laser source having a pulse repetition rate from about 10 to about 100 KHz, a wavelength from about 196 to about 355 nm, and TEM$_{00}$ mode quality $M^2<1.5$.

6. The method according to claim 1, wherein:
   step (c) comprises positioning said plane of said focal spot of said laser beam at a minimum depth below said first surface which does not result in micro-crack zone formation at said first surface.

7. The method according to claim 1, wherein:
   step (d) comprises moving said focal spot of said laser beam along said pre-selected path while said sheet is maintained stationary.

8. The method according to claim 1, wherein:
   step (d) comprises moving said sheet along said pre-elected path while said focal spot of said laser beam is maintained stationary.

9. The method according to claim 1, wherein:
   step (d) comprises providing relative movement between said laser beam and said sheet to move said focal spot of said laser beam along a pre-selected linear, curvilinear, or linear-curvilinear path.

10. The method according to claim 1, wherein:
    step (d) comprises moving said focal spot of said laser beam along a circular path.

11. The method according to claim 1, wherein:
    step (d) comprises moving the depth of said plane of said focal spot of said laser beam by optical means.

12. The method according to claim 1, wherein:
    step (d) comprises moving the depth of said plane of said focal spot of said laser beam by varying a distance between said source of laser energy and said first surface of said sheet.

13. The method according to claim 2, wherein:
    step (a) comprises providing a sheet of amorphous glass for use as a substrate for a hard disk magnetic or magneto-optical recording medium;
    step (b) comprises providing a pulsed UV laser source having a pulse repetition rate of about 20 KHz, a wavelength of about 355 nm, average power of about 3.5 W, and a focal spot diameter <5 μm; and
    step (d) comprises providing relative movement between said focal spot of said laser beam and said sheet along at least one circular path at a rate from about 40 to about 100 mm/sec. to form an about 20 μm wide micro-crack zone extending for a depth within said sheet of from about 100 to about 100 μm.

14. The method according to claim 13, wherein:
    step (d) comprises providing relative movement between said focal spot of said laser beam and said sheet along concentric inner and outer circular paths; and step (e) comprises separating said sheet along said concentric inner and outer paths to form an annularly-shaped disk.

15. An apparatus for performing laser-scribing of a sheet of material, comprising:
   (a) a mounting means for mounting a sheet of a material having first and second opposing major surfaces having a thickness t;
   (b) a pulsed UV laser source adapted for supplying a focussed beam of laser energy converging to a focal spot in a plane parallel to said first surface of said sheet of material;
   (c) means for providing relative movement between said focal spot of said laser beam and said sheet for moving said beam at a pre-selected rate along a pre-selected path extending over said first surface of said sheet of material; and
   (d) means for moving the depth of said plane of said focal spot of said laser beam at a pre-selected rate through a major portion of said thickness of said sheet of material from a depth near said first surface to a depth nearer said second surface.

16. The apparatus as in claim 15, wherein:
   said source (b) of laser energy is pulsed UV laser source having a pulse repetition rate from about 10 to about 100 KHz, a wavelength from about 196 to about 355 nm, and TEM $_{00}$ mode quality $M^2<1.5$.

17. The apparatus as in claim 16, wherein:
   said source (b) of laser energy is a pulsed UV laser source having a pulse repetition rate of about 20 KHz, a wavelength of about 355 nm, average power of about 3.5 W, and a focal spot diameter <5 $\mu$m; and
   said means (c) for providing relative movement between said focal spot of said laser beam and said sheet is adapted to provide a moving speed from about 40 to about 100 mm/sec.

18. The apparatus as in claim 15, wherein:
   said means (c) for providing relative movement between said focal spot of said laser beam and said sheet comprises means for moving said focal spot along a pre-selected linear or curvilinear path while maintaining said sheet stationary or means for moving said sheet along a pre-selected linear or curvilinear path while maintaining said focal spot of said laser beam stationary.

19. The apparatus as in claim 15, wherein:
   said means (d) for moving said depth of said plane of said focal spot of said laser beam at said pre-selected rate comprises optical means or means for varying a distance between said source of laser energy (b) and said first surface of said sheet.

20. An apparatus for performing laser-scribing of a sheet of material having first and second opposing major surfaces, comprising:
   (a) a pulsed UV laser source adapted for supplying a focussed beam of laser energy converging to a focal spot in a plane parallel to said first surface of said sheet of material; and
   (b) means for effecting relative movement between said focal spot of said beam of laser energy and said first surface of said sheet along a pre-selected path at a pre-selected rate while simultaneously effecting movement of the depth of said plane of said focal spot of said laser beam at a pre-selected rate through a major portion of the thickness of said sheet of material from a depth near said first surface to a depth nearer said second surface.

* * * * *